United States Patent Office 3,016,696
Patented Jan. 16, 1962

3,016,696
JET NOZZLE AREA CONTROL
Leland W. Bryant, Indianapolis, Ind., assignor to General Motors Corporation, Detroit, Mich., a corporation of Delaware
Filed June 13, 1958, Ser. No. 741,796
3 Claims. (Cl. 60—35.6)

My invention relates to the control of the area of variable jet nozzles of gas turbine jet engines. The two primary controls of non-afterburning turbojet engines are the amount of fuel supplied to the engine and the area of the jet nozzle. These determine the thrust output of the engine for any given ambient conditions and forward speed of the aircraft in which the engine is mounted. They also determine the values of engine revolutions per minute and turbine temperature, which must not exceed safe values. These controlling parameters also determine the operating efficiency of the engine or, in other words, its specific fuel consumption, which is the ratio of fuel consumption to thrust. It is important, therefore, that nozzle area be coordinated with fuel flow to provide the best practicably attainable specific fuel consumption and at the same time to prevent turbine overspeed or overtemperature. If the engine includes an afterburner, afterburner fuel supply is a third controlling factor. Afterburning is ordinarily employed only when the engine is at full rated power. Afterburning also affects turbine speed and jet nozzle area.

In a typical variable area nozzle jet engine the engine is operated with the nozzle wide open at low fuel flow and thrust settings. As the power setting of the engine is increased, the fuel flow is increased with the nozzle substantially wide open until the engine speed reaches its maximum value, or a value near the maximum value. Beyond this point, the thrust of the engine is increased by closing the nozzle, and fuel flow continues to be increased to maintain turbine speed at the rated value. In a further range of the power setting, the afterburner is put into operation. It is possible to schedule both engine speed and nozzle area as a function of the position of a pilot's control lever by which the operation of the engine is determined. Such a control, while simple, has serious limitations and disadvantages. There is no unique correlation of engine speed and nozzle area for best performance or economy of the engine. Such a control ordinarily requires some means to limit turbine temperature. There have also been proposals to control the nozzle area directly by turbine temperature or by turbine pressure ratio. In this connection, by way of explanation, if other conditions remain constant, closing the jet nozzle reduces turbine pressure ratio and increases turbine temperature. Opening the nozzle increases turbine pressure ratio and decreases turbine temperature. The effect on turbine temperature is an indirect one. If the nozzle is closed, increasing the pressure drop across the nozzle and thereby decreasing the turbine pressure drop or pressure ratio, more fuel must be supplied to the engine to maintain turbine speed. The result is an increase in turbine temperature. Igniting the afterburner also decreases turbine pressure ratio unless the jet nozzle is opened to accommodate the higher temperature exhaust gases.

Neither control by turbine pressure ratio or by turbine outlet temperature is satisfactory. Turbine pressure ratio is a rather poor index of turbine temperature, which is the quantity which must be limited for safety of the engine and the quantity which best determines propulsive efficiency. Controls responsive to turbine temperature have a slow rate of response which leads to overshoots of turbine temperature during transients and, in general, inaccurate control. Neither pressure ratio control alone nor temperature control alone is well adapted to maintain engine operation at the most efficient ratio of thrust to fuel consumption.

In the nozzle area control according to my invention, area control is responsive both to turbine pressure ratio and to turbine temperature. The pressure ratio control gives a very quick response to transients and a high degree of protection to the turbine during transients. The temperature control serves to adjust the pressure ratio control to maintain the desired turbine temperature and the best engine efficiency. Two preferred modes by which turbine pressure ratio and turbine temperature are employed to control nozzle area are described in the succeeding specification, which will make the nature and advantages of the invention clear to those skilled in the art.

Referring to the drawings.

Figures 1, 2:
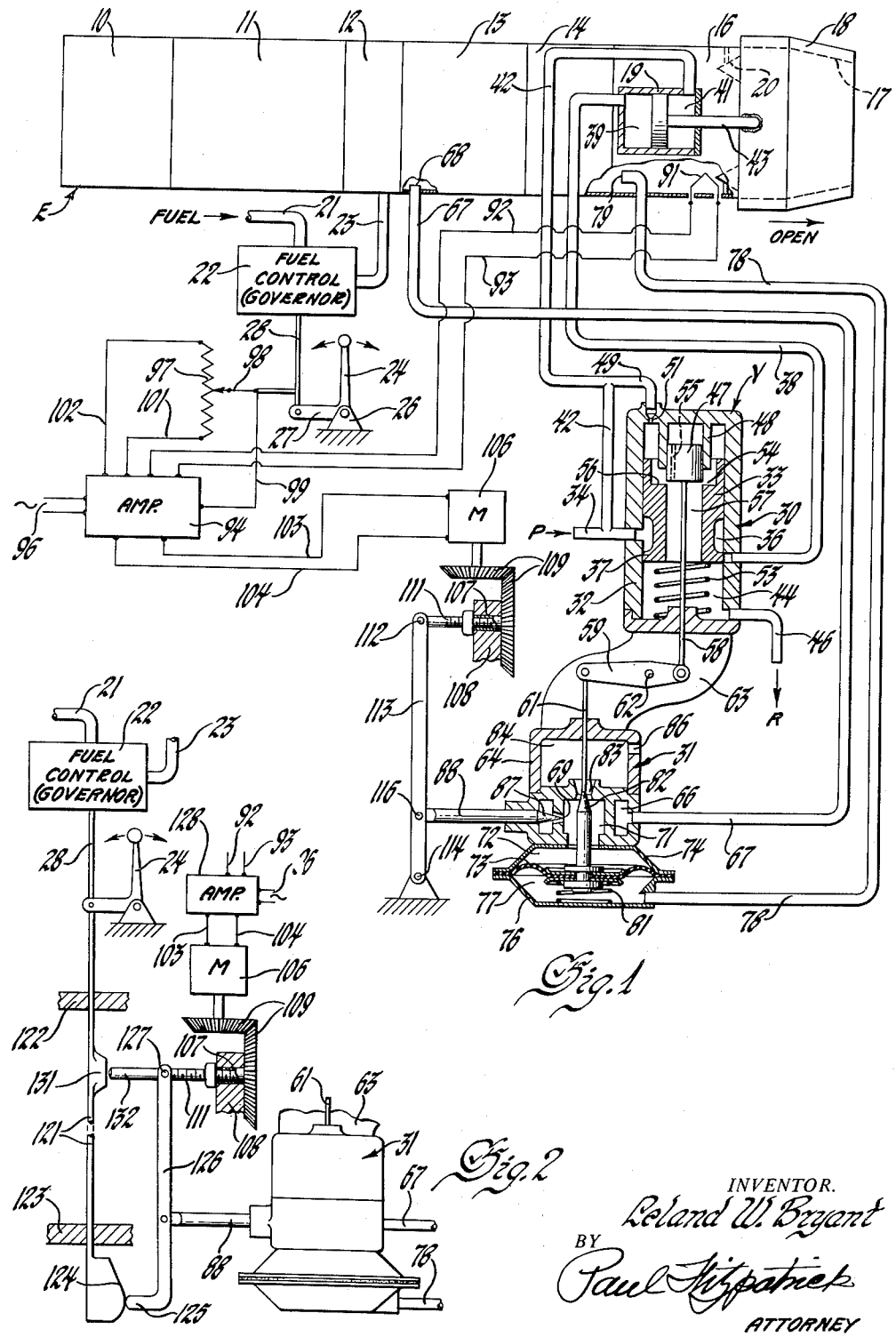
FIGURE 1 is a schematic diagram of a first embodiment of a nozzle area control system according to the invention.
FIGURE 2 is a partial schematic diagram of a second embodiment of the invention.

Referring to FIGURE 1, there is illustrated a conventional turbojet engine E comprising an air inlet 10, a compressor section 11, a diffuser section 12, a combustion section 13, a turbine section 14, and an exhaust duct 16. The turbine drives the compressor which supplies air to the combustion section, in which fuel is burned, and the resulting combustion products are supplied to the turbine which discharges into the exhaust duct. The engine is provided with a variable area jet nozzle 17 of suitable known type. There is shown schematically a type in which the area of the nozzle 17 is varied by an axially movable shroud 18 coupled to one or more expansible chamber hydraulic motors 19 which move the shroud axially of the engine to vary the nozzle area. The engine may include an afterburner represented by the flameholders 20. Since the engine structure is well known to those skilled in the art, it is not illustrated nor described in detail.

Fuel is supplied to the engine from any suitable source, such as a pump (not shown) driven by the engine, through a fuel line 21, a fuel control 22, and a line 23 leading from the fuel control to the fuel burners of the engine (not shown). In addition to various mechanisms known to those skilled in the art, which need not be described here, such fuel controls ordinarily include a governor responsive to engine speed and to a speed setting established by a controllable means such as a pilot's power control lever 24 by which the mode of operation of the engine is determined. The power control lever 24 is illustrated as pivotally mounted on a suitable support 26 and as including an arm 27 connected by a reciprocable link 28 to the fuel control by which the governor setting is established. Such fuel controls are well known. The control lever 24 also provides the primary control of jet nozzle area by means to be described.

The jet nozzle area is controlled by servo valve means V of known type which responds to turbine inlet and outlet pressures and to certain control factors. The servo means V per se is known, but it may be described briefly as an aid to understanding of the control system. The servo V includes an actuator control valve 30 and a pressure ratio responsive means 31 controlling the valve 30. Valve 30 controls the supply of hydraulic fluid to the nozzle actuating cylinder or cylinders 19. Valve 30 includes a valve housing 32 in which is reciprocably mounted a valve spool 33. Actuating fluid under pressure from any suitable pump is supplied through a line 34 and through a port in the case to the groove 36 in valve spool 33. A port in the case, blocked in the neutral position of the valve by the land 37 on the valve spool, is connected through a line 38 to the forward chamber 39 of motor 19. The rear chamber 41 of the motor is connected through line 42 directly to the pressure supply 34. Since the piston rod 43 of the motor which is connected to the shroud 18 extends through the rear end of the cylinder, chamber 41 is of smaller area than the chamber 39.

If valve spool 33 moves downwardly from its neutral position, shown, to supply full pressure to the forward chamber 39, the piston rod 43 is moved rearward to open the nozzle. If valve spool 33 moves upwardly, line 38 communicates through the chamber 44 in the valve body 32 with the hydraulic fluid return line 46 leading to the pump or reservoir. With pressure in chamber 39 thus reduced, motor 19 moves the shroud forward to close the nozzle.

The position of the actuator control valve spool 33 is controlled by a pilot valve 47 slidable in a guide 48 in the valve case 32. Hydraulic fluid from the pump is supplied to the upper end of the valve case 32 through a branch line 49 and an orifice 51. Hydraulic fluid entering through orifice 51 acts on the upper face of valve spool 33. This valve spool is biased upwardly by a compression spring 53. The pressure on the upper face of the valve spool is determined by the area of orifice 51 and the area of an annular orifice 54 between the control valve 47 and a shoulder 56 on the interior surface of valve spool 33. Orifice 54 communicates through the passage 57 in valve spool 33, chamber 44, and line 46 with the low pressure or pump return. If control valve 47 moves upward, opening orifice 54, the pressure above valve 33 is reduced and spring 53 moves it upward. If control valve 47 moves downwardly, closing orifice 54, pressure builds up above valve spool 33, moving it downward until the orifice 54 is opened sufficiently to balance the forces acting on the valve spool 33. A passage 55 through pilot valve 47 balances the pressures on this valve.

The control valve 47, and therefore the valve 33 and cylinder 19, are controlled by the pressure ratio responsive means 31 by means of a reciprocable actuating rod 58, a lever 59, and a control rod 61 actuated by the pressure ratio responsive means 31. Lever 59 is pivoted on a fulcrum 62 which extends from a bracket 63 which rigidly connects the servo valve 30 with the pressure ratio responsive control means 31. The ratio control means 31 includes a case or housing 64 which defines an annular chamber 66 connected by a pressure line 67 to a static pressure probe 68 which preferably senses static compressor discharge pressure at the entrance to the combustion chamber, this pressure being substantially equal to turbine inlet pressure. Chamber 66 communicates through an orifice 69 and a chamber 71 with a chamber 72 above a flexible diaphragm 73. This diaphragm is mounted in a case comprising an upper portion 74 and a lower portion 76. The chamber 77 below the diaphragm is connected through a pressure line 78 with a total pressure probe 79 in the turbine outlet. A compression spring 81 biasing diaphragm 73 upwardly may be provided. This spring exerts a very light force on the diaphragm. It varies the pressure ratio control point slightly with altitude to compensate for Mach number effects due to low air density at high altitude. The diaphragm is connected to the control rod 61 so as to move the rod upward or downward in response to variations in the pressures on the two sides of the diaphragm. A tapered or contoured control valve portion 82 of the rod 61 varies the area of an orifice 83 connecting chamber 71 to a chamber 84 which is open to atmospheric pressure through an outlet 86. The area of orifice 69 is also varied by a contoured valve member or needle 87 integral with a stem 88 reciprocable in the case 64.

The operation of the pressure ratio control may be explained as follows: The pressure below diaphragm 73 is turbine outlet pressure, which is lower than turbine inlet pressure. The pressure above the diaphragm is a fraction of turbine inlet pressure determined by the relative areas of orifices 69 and 83. Assuming for the moment that valve stem 88 is fixed and thereby the area of orifice 69 is fixed, the pressure above the diaphragm will be some fixed fraction of turbine inlet pressure. If the pressure above diaphragm 73 is greater than that below the diaphragm, the diaphragm will move control rod 61 downwardly, opening orifice 83, until the pressures on the diaphragm are balanced. This movement will actuate control valve 33 and cylinder 19 to close the jet nozzle and thereby reduce turbine pressure ratio. The ratio will be reduced until diaphragm 73 is balanced with needle 82 and valve 33 in their neutral positions. Similarly, if pressure ratio is too low, needle 82 will move upwardly to increase the pressure above diaphragm 73 and in so doing will cause the nozzle to open.

The normal or control point ratio of the pressure in chamber 72 to turbine inlet pressure is determined by the area of orifice 69 and thus by needle valve stem 88. The position of valve stem 88 is determined by means responsive to the engine power setting determined by control lever 24 and to turbine temperature. Specifically, it is preferred that turbine temperature be measured in terms of turbine outlet temperature, although any other value indicative of turbine temperature, such as turbine inlet temperature, might be employed for this purpose. Turbine outlet temperature is measured by one or more thermocouples 91 in the exhaust duct 16 connected through leads 92 and 93 to a control amplifier 94 energized from any suitable source 96. Amplifier 94 responds to actual turbine temperature measured by thermocouples 91 and to a setting of desired or scheduled turbine temperature determined by the position of the control lever 24. This setting may be effected by a potentiometer 97 connected to the amplifier and having a contact 98 movable over the potentiometer 97 by the control lever 24 and connected to the amplifier. The relation of the potential on line 99 connecting the movable contact to the amplifier to the potentials on lines 101 and 102 connecting the potentiometer to the amplifier may set a schedule of desired turbine temperature into the amplifier, which is there compared to the actual turbine temperature to provide a control output responsive to temperature error. The details of the amplifier 94 are not illustrated, since such control amplifiers serving this purpose are well known. The amplifier is connected through lines 103 and 104 to a suitable electric motor 106 adjusting the ratio controlling valve member 88 through suitable mechanical linkage. As illustrated, motor 106 drives an internally threaded shaft 107 mounted in a support 108 through bevel gears 109. A screw 111 threaded into the nut 107 is connected by a pivot 112 to one end of a lever 113 having a fixed fulcrum 114. A pin 116 connects an intermediate point of the lever to the valve needle 88.

The control lever 24 sets a schedule of engine speed in terms of control lever position through the fuel control 22 and also sets a schedule of turbine temperature through the movable contact 98. The temperature error, through amplifier 94 and motor 106, varies the position of the valve member 88 to vary the setting of turbine pressure ratio to which the pressure ratio control 31 responds. The pressure ratio control 31 will vary the area of the nozzle as necessary to maintain pressure ratio at the value determined by the setting of the needle 88. Thus area is controlled directly by pressure ratio, but the setting of pressure ratio is determined by the departure from scheduled temperature. Ultimately, therefore, area is varied to maintain turbine temperature at the value determined by the schedule established by the control lever 24. However, in response to transient conditions, the control responds directly to turbine pressure ratio with subsequent modification of the pressure ratio control point as the thermocouple, amplifier, and motor respond to the change in temperature.

As examples of the sort of transient to which the control system might respond, afterburner lightoff or flameout are perhaps the most extreme transient conditions likely to be experienced. When the afterburner is lit, the increase in temperature and volume of the exhaust gases requires an immediate increase in the nozzle area. The increase in the volume of the exhaust gases increases turbine discharge pressure, lowering the turbine pressure ratio, and causing the control to open the nozzle. Similarly, if the afterburner is in operation and is extinguished either deliberately or through an accidental flameout, the nozzle area is much too large, and turbine pressure ratio decreases. The control responds immediately to the lowered pressure ratio to close the nozzle. In either case, after the primary response to pressure ratio, the turbine outlet temperature may have departed somewhat from the desired value. This is trimmed or corrected by the temperature error response. The control also responds promptly to other transients of engine operation such as might be caused by a sudden change in control lever position calling for a rapid increase or decrease in fuel supply to the engine.

Another advantage of the control according to the invention lies in the fact that it provides an approximate nozzle area control even in the event of casualty to the temperature responsive system. In the event of failure of the temperature responsive system the usual result is movement of motor 106 to a null position representative of zero temperature error. The control may be calibrated so that the null position of the temperature response calls for a pressure ratio approximating reasonably closely to that pressure ratio which will give the desired turbine temperature.

FIGURE 2 shows a second form of the invention. This is a fragmentary view illustrating only those parts of the system of FIG. 2 which differ from the system of FIG. 1. FIGURE 2, taken with FIG. 1, is a full illustration of the second form. We may mention first those parts of the control system shown in FIG. 2 which remain the same as in FIGURE 1 and are included only to show the environment of the modified portions of the system. These are identified by the same numerals in FIG. 2 as in FIGURE 1. The fuel control and pilot's power control lever, the temperature motor 106, the drive from the motor 106 to the screw 111, the pressure ratio control device 31, and the pressure ratio setting needle 88 remain the same and are connected to the control valve 30 and variable nozzle in the same manner as previously described.

The power control 24 is connected to the fuel control by link 28 and is additionally connected to a reciprocable member 121 suitably guided in fixed supports 122 and 123. Member 121 mounts a contoured pressure ratio control cam 124 which coacts with a follower 125 on one end of a floating link 126 connected to the pressure ratio control member 88. The other end of floating member 126 is connected at 127 to the screw 111.

The amplifier 128 may be similar to the amplifier 94 of FIGURE 1 but differs in that it incorporates a fixed temperature reference and does not have means to supply a variable temperature reference signal such as the potentiometer 97 and follower 98 of FIGURE 1. The amplifier is connected to the thermocouples by lines 92 and 93 and provides an output to the motor to drive the motor in one direction or the other, depending upon whether turbine temperature is above or below the fixed reference value built into amplifier 128. Amplifier 128 will therefore tend to operate motor 106 to close the nozzle to raise turbine outlet temperature when the engine is operating at a low power level and turbine outlet temperature is low. Operation of the amplifier to close the nozzle at low engine power settings is prevented by a blocking cam 131 mounted on the reciprocable member 121 and engageable by a follower 132 integral with screw 111. In the low power range of settings of control lever 24, blocking cam 131 is in the path of follower 132 and prevents motion of screw 111 to the left of a fixed datum position, which would tend to close the nozzle. However, the screw 111 may move to the right to increase nozzle area in the event of overtemperature. Such overtemperature is unlikely in the absence of some failure of other parts of the control system, but the protective feature may be an advantage in the event of such casualty. In the high power portion of the control range where a turbine temperature normally will approach or equal and may exceed the safe maximum value, blocking cam 131 is out of the way of follower 132, and motor 106 may vary the setting of needle 88 to open or close the nozzle to hold turbine temperature to the preset limiting value. This temperature response acts as a trim on the value of pressure ratio set directly by cam 124 and follower 125 in response to power lever position. The power lever set value of turbine pressure ratio should normally give approximately the desired turbine outlet temperature or, in other words, it provides the best control of nozzle area available without the temperature reference. This control responds quickly to changes in power lever position or to changes in turbine pressure ratio with the power lever position constant. The temperature control acts as a vernier or trimming control to hold the turbine temperature at the maximum rated value and thus correct any error in the temperature setting resulting from the basic pressure ratio control.

It will be seen that both the control by error between scheduled and actual temperature trimming the pressure ratio setting, illustrated in FIG. 1, or the control by pressure ratio scheduled directly by power lever position and modified in the higher power ranges to maintain turbine temperature at the maximum value are particularly suited to solving the problems involved in providing rapid control of the nozzle area during transients and in providing the more accurate control possible through a response to temperature.

The detailed description of preferred embodiments of the invention for the purpose of explaining the principles thereof is not to be construed as limiting the invention, as many modifications may be made by the exercise of skill in the art without departing from the scope of the invention.

I claim:

1. A jet nozzle area control for a turbojet engine with a variable area jet nozzle comprising, in combination, means for varying the nozzle area, control means responsive to the ratio of turbine inlet pressure and turbine outlet pressure and including pressure ratio setting means establishing a control point for the control means, the control means being effective to actuate the varying means to vary nozzle area to maintain turbine pressure ratio at the control point established by the pressure ratio setting means, manually controllable means, means responsive to turbine temperature, pressure ratio scheduling means operated by the manually controllable means connected to the pressure ratio setting means for control thereof, pressure ratio trimming means actuated by the temperature responsive means and connected to the pressure ratio setting means to trim the setting thereof in response to actual turbine temperature, and means actuated by the controllable means blocking operation of the trimming means in a direction to decrease the pressure ratio setting through a portion of the range of movement of the controllable means.

2. A jet nozzle area control for a turbojet engine with a variable area jet nozzle comprising, in combination, servo means for varying the nozzle area, servo control means responsive to the ratio of turbine inlet pressure and turbine outlet pressure and including pressure ratio setting means establishing a control point for the servo control means, the servo control means being effective to vary nozzle area to maintain turbine pressure ratio at the control point established by the pressure ratio setting means, controllable means for establishing an engine power demand, means responsive to turbine temperature, pressure ratio scheduling means operated by the manually controllable means connected to the pressure ratio setting means for control thereof, pressure ratio trimming means actuated by the temperature responsive means and connected to the pressure ratio setting means to trim the setting thereof in response to actual turbine temperature, and means actuated by the controllable means blocking operation of the trimming means in a direction to decrease the pressure ratio setting through a portion of the range of movement of the controllable means.

3. A jet nozzle area control for a turbojet engine with a variable area jet nozzle comprising, in combination, servo means responsive to turbine pressure ratio and to a pressure ratio setting for controlling nozzle area to maintain the turbine pressure ratio equal to the ratio setting, means responsive to engine power demand establishing a basic value of pressure ratio setting, means responsive to turbine temperature trimming the pressure ratio setting, and means responsive to engine power demand throughout part of the power demand range blocking operation of the temperature responsive means in a direction to decrease the pressure ratio setting.

References Cited in the file of this patent
UNITED STATES PATENTS 2,790,303    Kutzler _____ Apr. 30, 1957

OTHER REFERENCES

SAE Transactions "A New Approach to Turbojet and Ramjet Engine Control" by Reed, volume 64, 1956, pp. 472–485.

Stephenson (1) "Principles of Gas Turbine Control Flight;" volume 68; No. 2437; Oct. 7, 1955, pages 590–592, page 591 relied on.

Stephenson (2) "Pneumatic Jet Nozzle Control;" Aircraft Engineering; volume 30; No. 348; pages 44 and 45.